United States Patent [19]

Hamagishi et al.

[11] Patent Number: 5,248,917
[45] Date of Patent: Sep. 28, 1993

[54] FLAT FLUORESCENT LAMP AND LIQUID CRYSTAL PROJECTOR INCORPORATING SAME

[75] Inventors: Goro Hamagishi, Toyonaka; Keiichi Kanatani, Hirakata; Shunichi Kishimoto, Kaizuka; Katsumi Terada, Tsuzuki; Yasuo Funazo, Hirakata; Takashi Ikeda, Hirakata; Masahiro Sakata, Hirakata; Hiroyuki Yagi, Nishinomiya, all of Japan

[73] Assignee: Sanyo Electric Co., Ltd., Osaka, Japan

[21] Appl. No.: 737,001

[22] Filed: Jul. 29, 1991

[30] Foreign Application Priority Data

| Jul. 31, 1990 | [JP] | Japan | 2-203378 |
| Nov. 29, 1990 | [JP] | Japan | 2-334956 |
| Jan. 17, 1991 | [JP] | Japan | 3-3663 |
| Jan. 21, 1991 | [JP] | Japan | 3-5186 |
| Feb. 20, 1991 | [JP] | Japan | 3-26361 |
| Mar. 1, 1991 | [JP] | Japan | 3-36047 |
| Jul. 18, 1991 | [JP] | Japan | 3-177873 |

[51] Int. Cl.⁵ .............................. G09G 3/10
[52] U.S. Cl. .............................. 315/169.1
[58] Field of Search ............ 359/50, 53; 313/492, 313/495, 497, 496, 414, 415; 315/169.1, 169.3, 169.4, 167

[56] References Cited

U.S. PATENT DOCUMENTS

| 3,566,187 | 2/1971 | DuBois, Jr. | 315/169.1 |
| 4,218,636 | 8/1980 | Miyazawa | 315/169.1 |
| 4,686,575 | 8/1987 | Shimada et al. | 315/169.1 |
| 5,099,178 | 3/1992 | Bozzer et al. | 315/169.1 |

FOREIGN PATENT DOCUMENTS

| 56-19861 | 2/1981 | Japan . |
| 63-10458 | 1/1988 | Japan . |

*Primary Examiner*—Robert J. Pascal
*Assistant Examiner*—Michael B. Shingleton
*Attorney, Agent, or Firm*—Nikaido, Marmelstein, Murray & Oram

[57] ABSTRACT

A flat fluorescent lamp comprises a flat glass container formed by a front glass panel, a rear glass panel and glass frames, a phosphor coating formed along the inner surface of the front glass panel, an anode disposed in the vicinity of the phosphor coating, a plurality of linear cathodes arranged in parallel to the anode and supported by support members, and at least one mesh electrode disposed between the anode and the cathodes The intensity of light of the lamp is adjusted by applying a pulse voltage to the mesh electrode.

5 Claims, 17 Drawing Sheets

FLAT FLUORESCENT LAMP AND LIQUID CRYSTAL PROJECTOR INCORPORATING SAME

FIELD OF THE INVENTION

The present invention relates to a flat fluorescent lamp suitable as the backlight for liquid crystal panels for use in liquid crystal television receivers and like liquid crystal display devices, liquid crystal projectors, etc., and more particularly to a method of adjusting the intensity of light of flat fluorescent lamps without irregularities in luminance, the construction of a flat fluorescent lamp having high luminescence efficiency and a liquid crystal projector having the lamp incorporated therein.

BACKGROUND OF THE INVENTION

Conventional flat fluorescent lamps comprise a flat glass container which is formed by a front glass panel 1, rear glass panel 2 and an unillustrated glass frame as shown in FIG. 6. The front glass panel 1 is formed on its inner surface with a phosphor coating 9, over which is provided an anode 7 having the function of a metal back formed by the vacuum evaporation of aluminum. A high voltage supply portion (not shown) is disposed at the end of the anode 7 with a carbon paste or the like provided therebetween.

Arranged inside the glass container are a plurality of linear cathodes 5 supported by posts 4, and a pair of mesh electrodes 6a, 6b serving as grid electrodes. The first mesh electrode 6a controls the amount of electrons to be supplied from the linear cathodes 5 to the phosphor coating 9 to which a high voltage is applied. A voltage lower than that applied to the anode 7 is applied to the second mesh electrode 6b to permit the first mesh electrode 6a to block electrons. The energy of the electrons from the linear cathodes 5 passes through the anode 7, exciting the phosphor coating 9 to cause the coating to luminesce with a high luminance.

Indicated at A and B in the drawing are opposite ends of the linear cathodes 5, and at C is the midportion of each cathode. If a d.c. voltage is applied to the linear cathodes 5, a potential gradient occurs between the cathode ends to create irregularities in luminance. Accordingly, sine-wave voltages reverse to each other in phase are applied to the respective ends of each linear cathode 5 as seen in FIG. 7. In FIG. 7, the solid line represents the waveform of voltage applied to one end A of the cathode 5, and the broken line represents the waveform of voltage of reverse phase to the above applied to the other end B of the cathode. At this time, the midportion C is grounded.

FIGS. 8 to 13 show the amount of electrons passing through the mesh electrodes in the case where a d.c. voltage is applied to the mesh electrode 6a and is varied to control the intensity of light of the lamp as in the prior art. In these drawings, plotted as abscissa is time T vs. the amount I of passage of electrons as ordinate. The amounts of passage of the electrons generated from the portions A, B and C during high-luminance luminescence are represented in FIGS. 8, 9 and 10, respectively, by hatching. The amounts of passage of the electrons produced from the portions A, B and C during low-luminance luminescence are represented in FIGS. 11, 12 and 13, respectively, by hatching. During the high-luminance luminescence shown in FIGS. 8, 9 and 10, the portions A, B and C are all generally uniform in the amount of electrons passing through the mesh electrodes.

However, the low-luminance luminescence shown in FIGS. 11, 12 and 13 involves the problem that the end portions A and B produce higher brightness than the midportion C to result in uneven luminance since when the voltage applied to the end of the linear cathode 5 is $-3$ V (see FIG. 7), the greatest potential difference results relative to the mesh electrode 6a. Especially, FIGS. 11 to 13 show little or no luminescence at the midportion in contrast with luminescence occurring at the end portions.

On the other hand, Unexamined Japanese Patent Publication SHO 56-19861 discloses a flat fluorescent lamp of the transmission type as shown in FIG. 27.

As illustrated, a flat glass container is formed by a front glass panel 1, a rear glass panel 2 and a glass frame 3.

Arranged inside the glass container are a plurality of linear cathodes 5 supported by posts 4, a mesh electrode 6 serving as a grid electrode, a transparent electrode 7 made of tin oxide or indium oxide and formed on the inner surface of the front glass panel 1, a high voltage supply portion 8 at the end of the anode, and a phosphor coating 9 formed on the anode. The linear cathodes 5 emit electrons, which excite the phosphor coating 9 and cause the coating to luminesce with a high luminance.

The fluorescent lamp has the drawback that the light from the phosphor coating 9 is emitted also through the rear glass panel 2.

FIG. 28 shows another flat fluorescent lamp disclosed in Unexamined Japanese Patent Publication SHO 63-10458 and serving as a backlight for liquid crystal panels.

As illustrated, a front glass panel 1, a rear glass panel 2 and glass frame 3 form a flat glass container which has arranged therein a plurality of linear cathodes 5 supported by posts 4, a mesh electrode 6 serving as a grid electrode, a phosphor coating 9 formed on the inner surface of the front glass panel, and an anode 7 formed as a metal back with aluminum by vacuum evaporation on the phosphor coating 9. A high voltage supply portion 8 is provided at the end of the anode 7 with a carbon paste or the like disposed therebetween. The energy of the electrons from the linear cathodes 5 passes through the anode 7 and excites the phosphor coating 9 to cause the coating to luminesce with a high luminance.

With this fluorescent lamp, the light emitted from the phosphor coating toward the rear panel 2 is reflected at the metal back and directed toward the front glass panel 1.

However, the fluorescent lamp has the drawback that the energy possessed by electrons is consumed when passing through the metal back to result in a reduced efficiency.

Further with either of the flat fluorescent lamps shown in FIGS. 27 and 28, discharge is likely to occur between the post 4 and the high voltage supply portion 8 of the anode 7 to entail the problem that a voltage of sufficiently high value is not supplied to the anode, failing to ensure satisfactory luminescence performance.

Further because electrons are released straight only from the portions of the linear cathodes 5 facing the front panel toward the mesh electrode 6 almost without spreading, the amount of electrons at the intermediate portion between the two adjacent linear cathodes 5, 5 is small. This leads to the problem that a dark area is produced.

Still another problem is encountered in that the energy of the electron beam partly becomes a heat loss to overheat the phosphor coating 9 to deteriorate the coating.

SUMMARY OF THE INVENTION

An object of the present invention is to provide a method of adjusting the light intensity of a flat fluorescent lamp to diminish irregularities in luminance due to a potential gradient of the cathode especially during low-luminance luminescence.

Another object of the present invention is to provide a method of adjusting the intensity of light of a flat fluorescent lamp which comprises a flat glass container formed by a front glass panel 1, a rear glass panel 2 and glass frames 3a, 3b, 3c, a phosphor coating 9 formed along the inner surface of the front glass panel 1, an anode 7 disposed in the vicinity of the phosphor coating, a plurality of linear cathodes 5 arranged in parallel to the anode 7 and supported by support members 4, and at least one mesh electrode 6a disposed between the anode 7 and the linear cathodes 5, the method comprising applying a pulse voltage to the mesh electrode 6a to adjust the amount of electrons reaching the phosphor coating 9.

With the above light intensity adjusting method, the voltage is applied to the mesh electrode when the linear cathodes have no potential gradient to release electrons from the cathodes. This eliminates the irregularities in luminance involved in the prior art due to a potential gradient of the linear cathodes.

Another object of the present invention is to provide a flat fluorescent lamp which is adapted to efficiently convert the energy of electrons from linear cathodes to an emission of light from a phosphor coating.

Another object of the present invention is provide a flat fluorescent lamp comprising a flat glass container formed by a front glass panel 1, a rear glass panel 2 and glass frames 3a, 3b, an anode 7 formed along the inner surface of the front glass panel 1, a phosphor coating 9 formed in the vicinity of the anode 7, a plurality of linear cathodes 5 arranged in parallel to the anode 7 and supported by support members 4, at least one mesh electrode 6a or 6b disposed between the anode 7 and the linear cathodes 5, and a glass spacer 10 disposed between the anode 7 and the support members 4 for preventing discharge between the anode 7 and the support members 4.

With the flat fluorescent lamp described above, discharge that would otherwise occur between the anode and the support member is prevented by the glass spacer interposed therebetween.

Another object of the present invention is to provide a flat fluorescent lamp comprising a flat glass container formed by a front glass panel 1, a rear glass panel 2 and glass frames 3a, 3b, an anode 7 formed along the inner surface of the front glass panel 1, a phosphor coating 9 formed in the vicinity of the anode 7, a plurality of linear cathodes 5 arranged in parallel to the anode 7, at least one mesh electrode 6a or 6b disposed between the anode 7 and the linear cathodes 5, and a rear electrode 11 provided on the inner surface of the rear glass panel 2 and to be applied with a higher voltage than the linear cathodes 5.

The application of voltage to the rear electrode of the lamp permits electrons to be released also from the portions of the linear cathodes facing the rear panel, whereby the flow of electrons toward the mesh electrode is rendered uniform to uniformly irradiate the phosphor coating. This achieves a uniform luminance, consequently obviating occurrence of the dark area conventionally produced.

Another object of the present invention is to provide a flat fluorescent lamp comprising a flat glass container formed by a front glass panel 1, a rear glass panel 2 and glass frames 3a, 3b, an anode 7 formed along the inner surface of the front glass panel 1, a phosphor coating 9 formed in the vicinity of the anode 7, a plurality of linear cathodes 5 arranged in parallel to the anode 7, at least one mesh electrode 6a or 6b disposed between the anode 7 and the linear cathodes 5, and a cooling liquid portion 13 provided in the vicinity of the front glass panel 1.

The cooling liquid portion of the lamp cools the front glass panel, with the result that the phosphor coating is prevented from deterioration due to overheating.

Another object of the present invention is to provide a flat fluorescent lamp comprising a flat glass container formed by a front glass panel 1, a rear glass panel 2 and glass frames 3a, 3b, an anode 7 formed on the inner surface of the front glass panel 1, a phosphor coating 9 formed in the vicinity of the anode 7, a plurality of linear cathodes 5 arranged in parallel to the anode 7, at least one mesh electrode 6a or 6b disposed between the anode 7 and the linear cathodes 5, and a multilayer interference film 12 formed on the inner surface or the outer surface of the front glass panel 1.

Of the diffused light emitted from the phosphor coating, a component of light approximately perpendicular to the front glass panel 1 passes through the interference film 12 and the front panel 1 and is emitted forward. On the other hand, a component of light included in the diffused light and making a large angle of inclination with respect to the front glass panel 1 is reflected into the phosphor coating without passing through the interference film 12, whereupon the light component is diffused again within the phosphor film. A component of light included in the light thus diffused and approximately perpendicular to the front glass panel passes through the multilayer interference film 12 and the front glass panel 1 and is emitted forward. Accordingly, through repetitions of reflection and diffusion in the manner described above, light is emitted forward from the front glass panel within a narrow angular range centered at the perpendicular direction to the front panel, with the result that a larger quantity of light emanates forward than in the prior art.

Another object of the present invention is to provide a liquid crystal projector wherein a flat fluorescent lamp is used as the light source thereof and which is thereby made simpler in construction and compacter than in the prior art.

Still another object of the present invention is to provide a liquid crystal projector comprising three flat fluorescent lamps corresponding to the three primary colors respectively, three liquid crystal panels arranged in front of the respective three fluorescent lamps, and projection means for combining the beams of light passing through the respective liquid crystal panels and projecting the combined beam onto a screen, each of the flat fluorescent lamps comprising a flat glass container formed by front glass panel 1, a rear glass panel 2 and glass frames 3a, 3b, an anode 7 formed on the inner surface of the front glass panel 1, a monochromatic phosphor coating 9 formed in the vicinity of the anode 7, a plurality of linear cathodes 5 arranged in parallel to the anode 7, and at least one mesh electrode 6a or 6b disposed between the anode 7 and the linear cathodes 5.

With the liquid crystal projector described, there is no need to separate the light from a metal halide lamp into three primary colors by a plurality of dichroic mirrors unlike prior-art devices. The projector can therefore be made compacted and simplified.

DETAILED DESCRIPTION OF THE INVENTION

First Embodiment

A first embodiment of the present invention will be described with reference to FIGS. 1 to 4.

Figure 1:
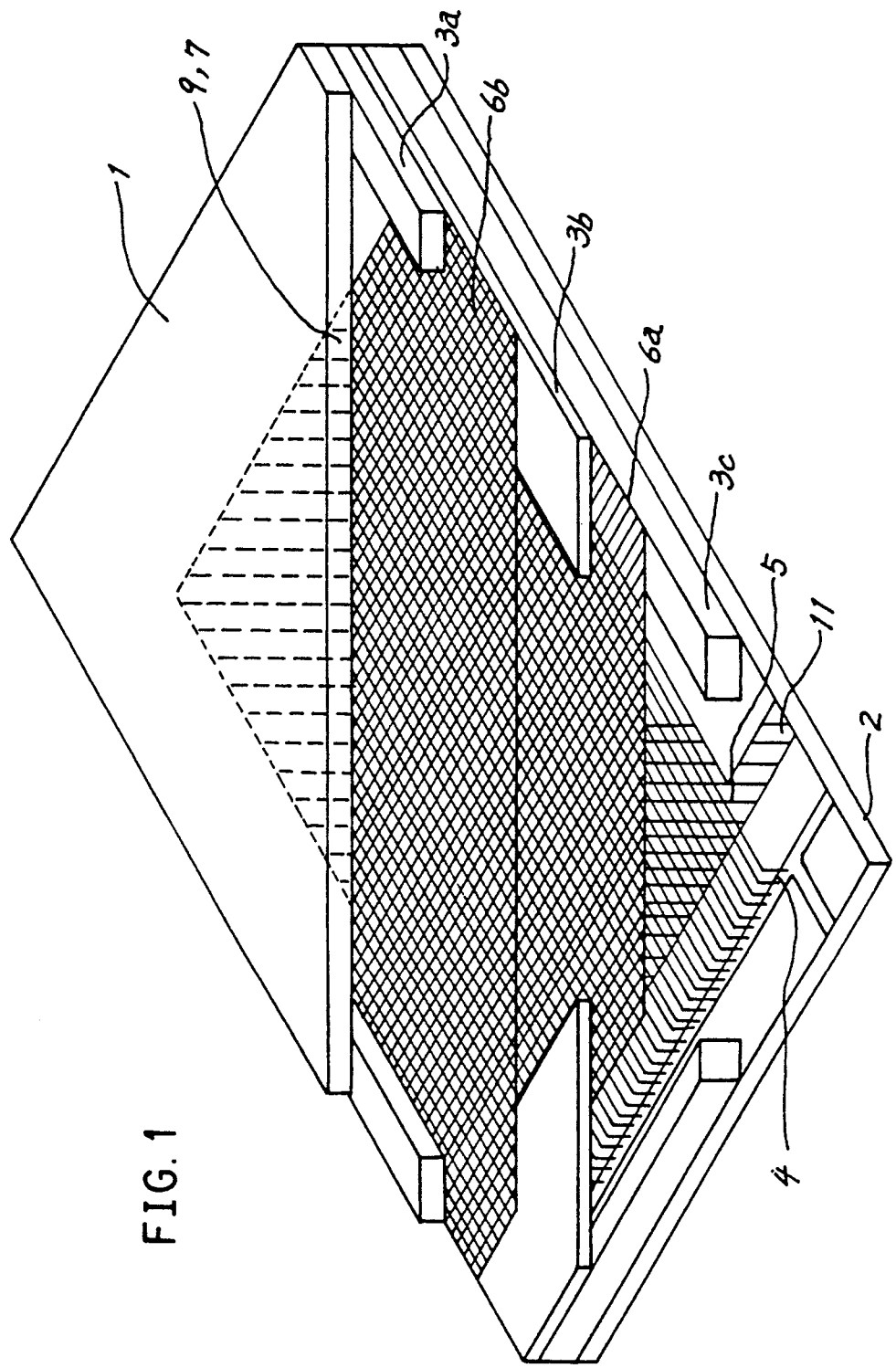
FIG. 1 is a perspective view partly broken away and showing a flat fluorescent lamp for which the method of the present invention is to be practiced for adjusting the light intensity thereof.
Figure 2:
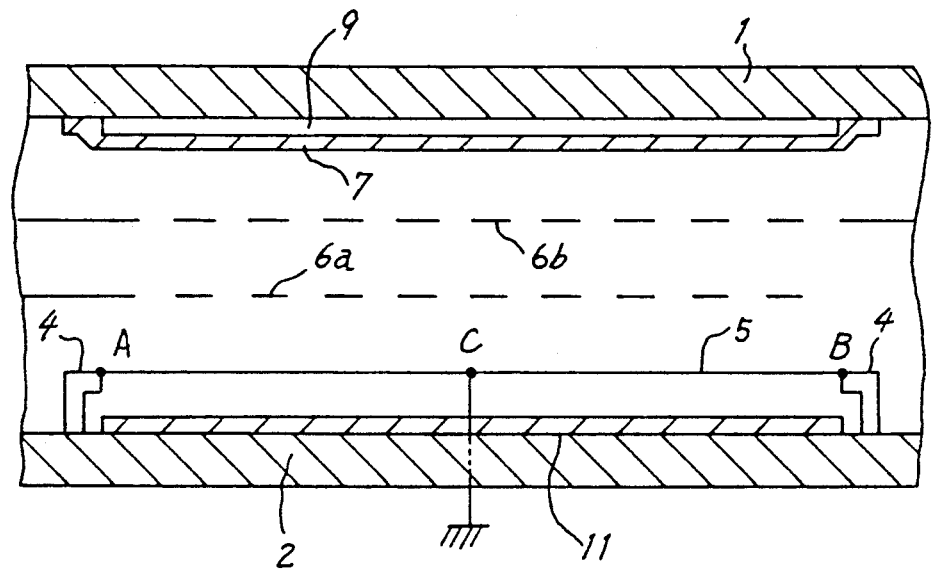
FIG. 2 is an enlarged fragmentary view in section of the lamp.
Figure 6:
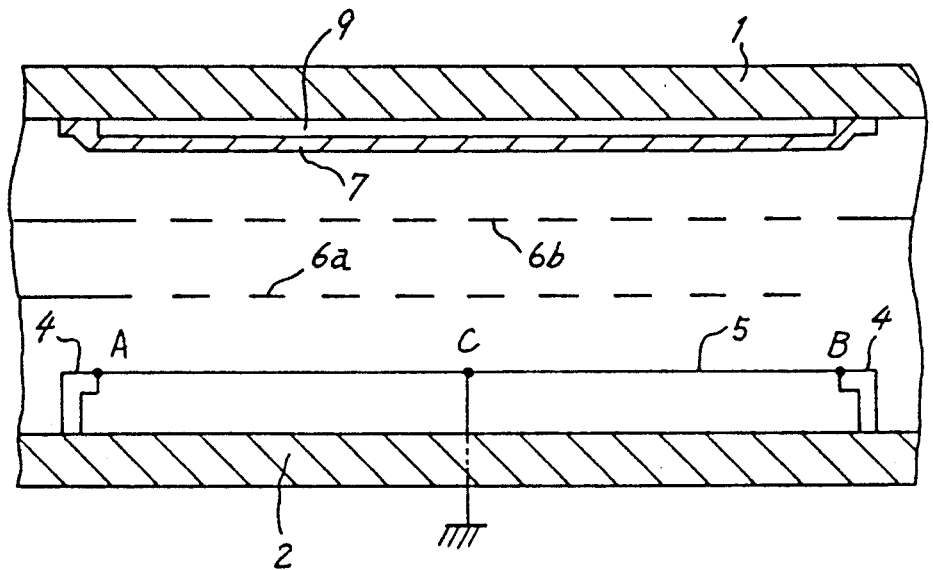
FIG. 6 is a fragmentary view in section of a conventional flat fluorescent lamp.

As seen in FIGS. 1 and 2, the flat fluorescent lamp of the present embodiment has substantially the same construction as the conventional one shown in FIG. 6 except that the former has a rear electrode 11 on the inner surface of the rear glass panel 2 for modifying the path of electrons to ensure a uniform flow of electrons. Throughout the drawings, like parts are designated by like reference numerals.

Sine-wave voltages of 6 $V_{p-p}$ ($\pm 3$ V), 100 KHz in frequency, is applied to the linear cathodes 5. D.c. voltages are applied to other electrodes, the voltage values being 300 V for the mesh electrode 6b, 10 KV for the anode 7, and 16 V for the rear electrode 11.

Figure 7:
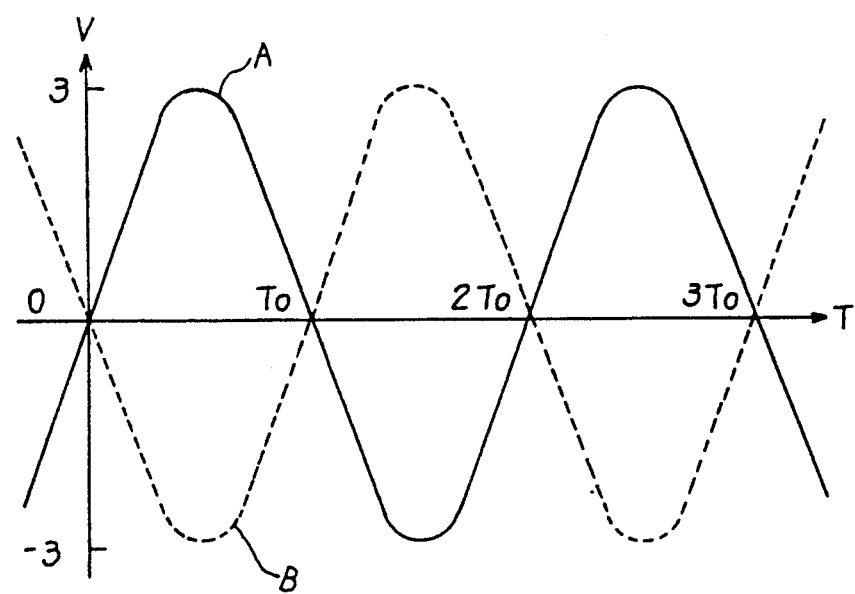
FIG. 7 is a diagram showing the waveforms of voltages which are to be applied to the respective ends of a linear cathode.
Figure 8:
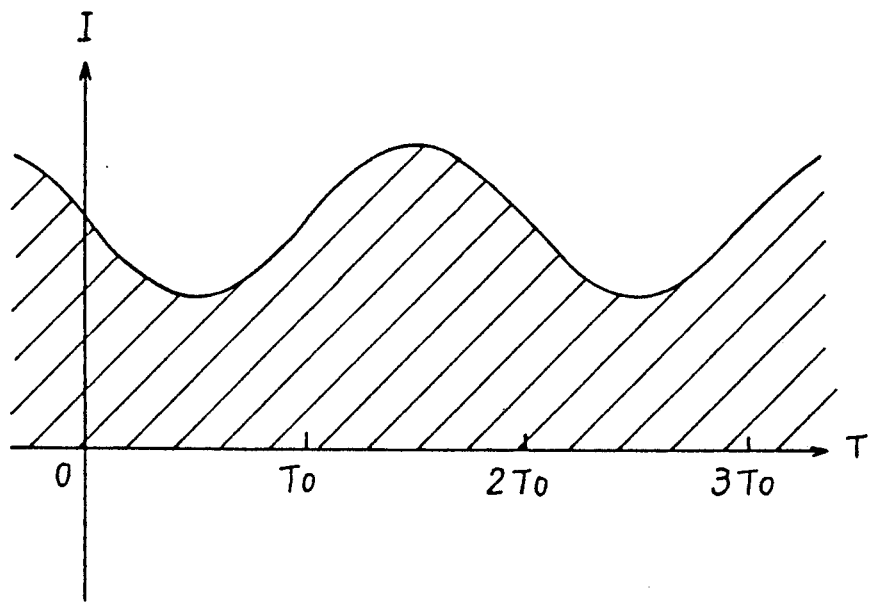
FIG. 8 is a graph showing the amount of electrons passing through a mesh electrode and generated from one end of the linear cathode during high-luminance luminescence.
Figure 9:
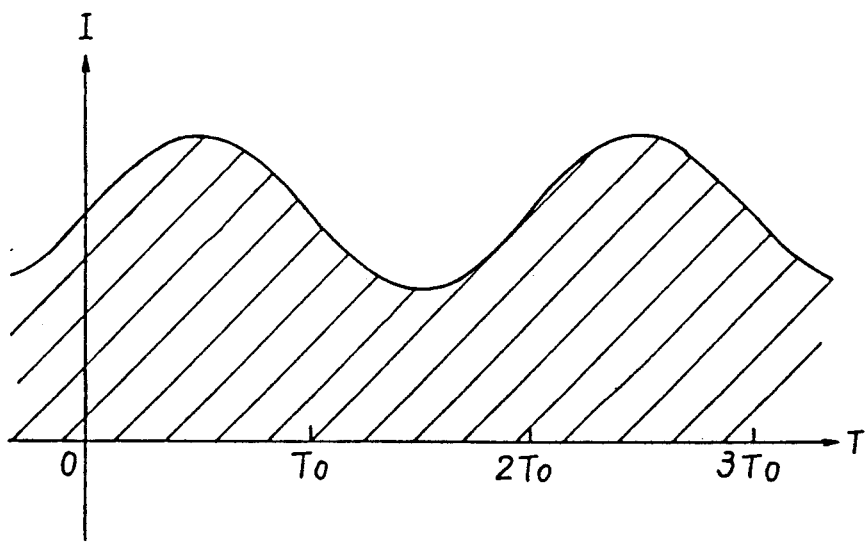
FIG. 9 is a graph showing the amount of electrons passing through the mesh electrode and generated from the other end of the linear cathode during high-luminance luminescence.
Figure 10:
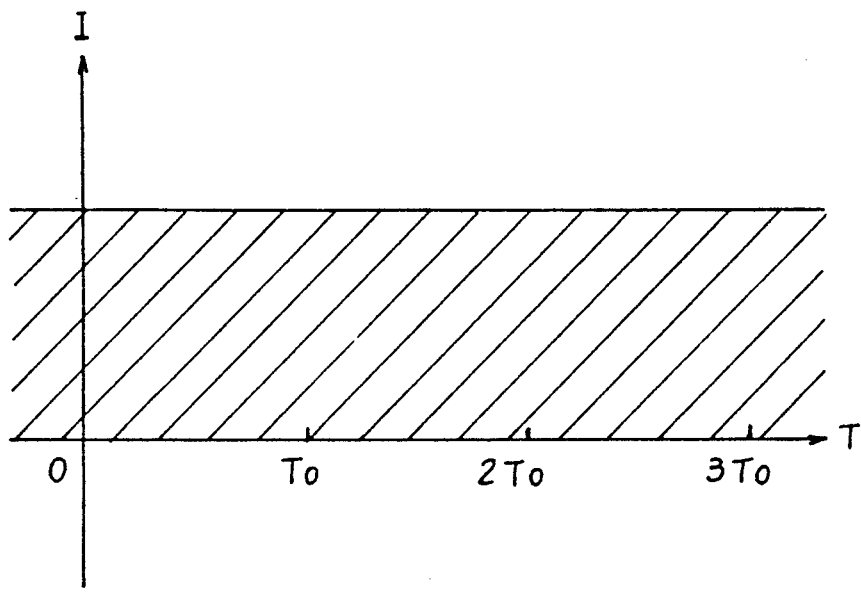
FIG. 10 is a graph showing the amount of electrons generated from the midportion of the linear cathode and passing through the mesh electrode during high-luminance luminescence.
Figure 11:
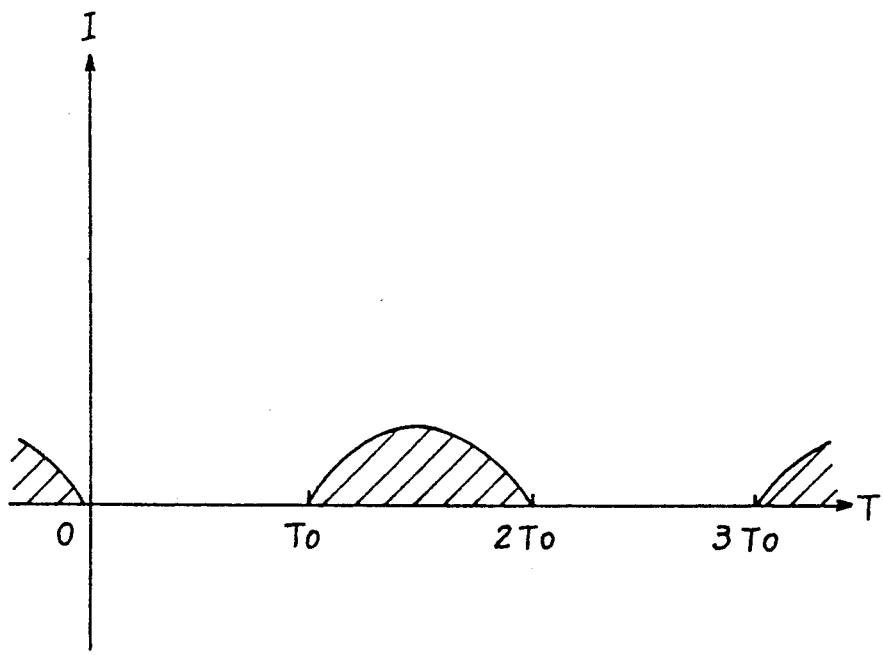
FIG. 11 is a graph corresponding to FIG. 8 and showing the corresponding amount of electrons during low-luminance luminescence.
Figure 12:
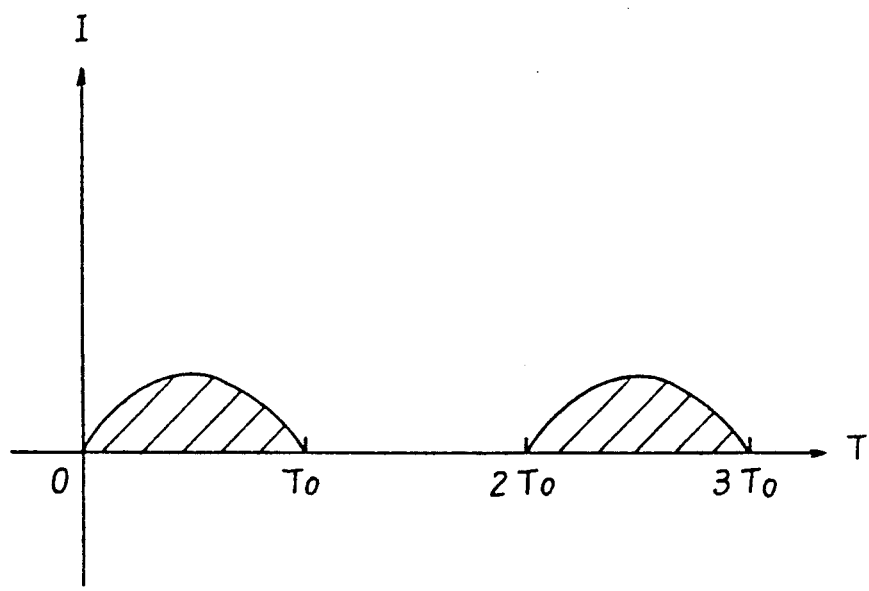
FIG. 12 is a graph corresponding to FIG. 9 and showing the result achieved by low-luminance luminescence.
Figure 13:
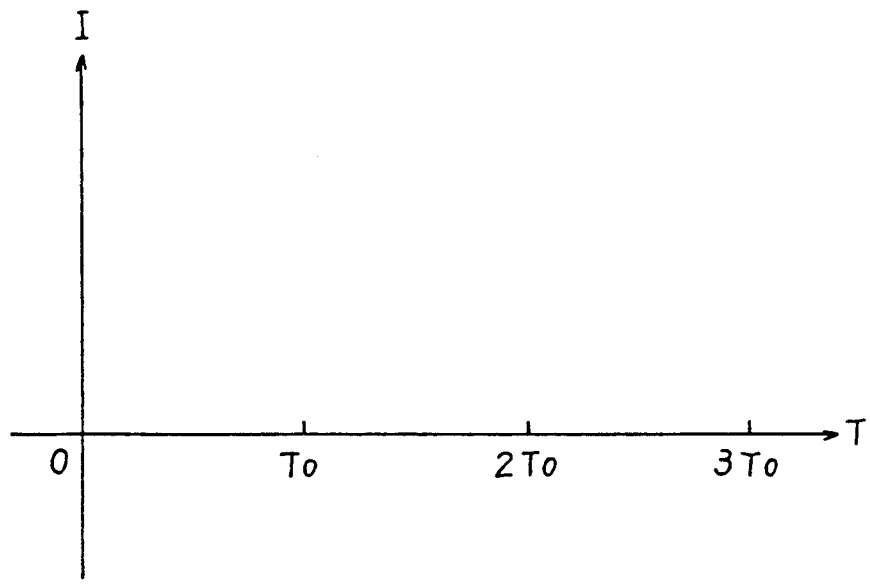
FIG. 13 is a graph corresponding to FIG. 10 and showing the result achieved by low-luminance luminescence.

As shown in FIG. 7, the voltages to be applied to each linear cathode 5 have a sinusoidal waveform with a period of $2T_0$. The solid line represents the voltage to be applied to one end A of the cathode 5, and the broken line the other voltage to be applied to the other end B thereof and reverse in phase to the voltage to the end A.

Figure 3:
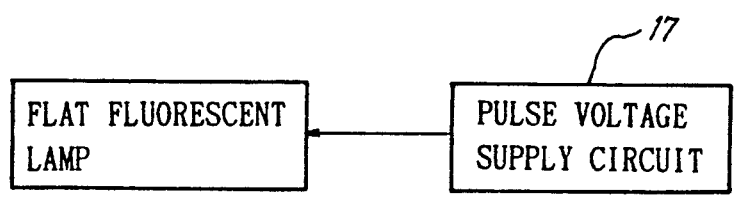
FIG. 3 is a block diagram showing a pulse voltage supply circuit as connected to the lamp of the invention.
Figure 4:
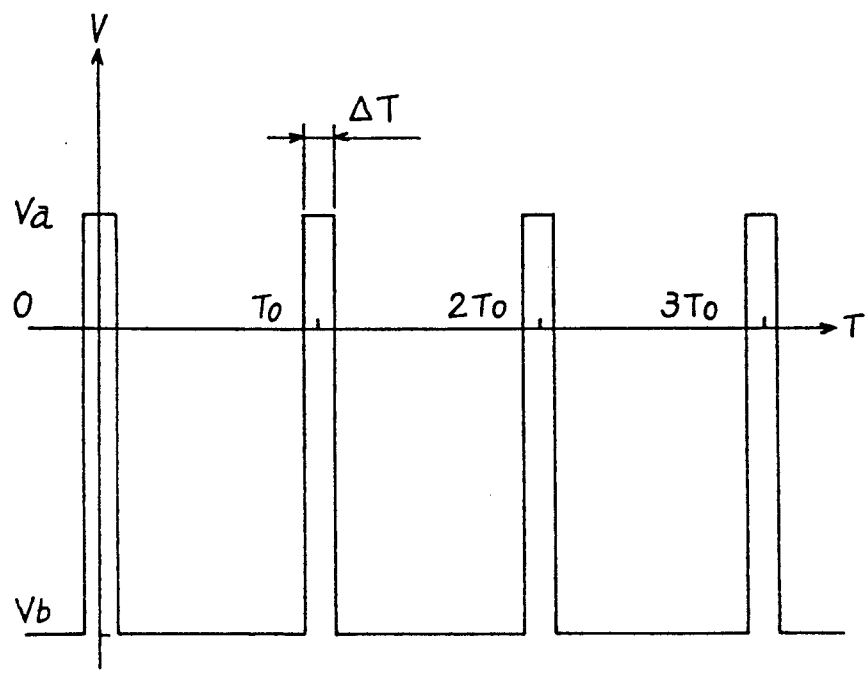
FIG. 4 is a diagram showing the waveform of a pulse voltage which is to be applied to a mesh electrode.

FIG. 3 shows a pulse voltage supply circuit 17 connected to the mesh electrode 6a, whereby a grid pulse voltage shown in FIG. 4 is applied to the mesh electrode 6a. The period $T_0$ of the pulse voltage is in timed relation with the period $T_0$ of the sine waves shown in FIG. 7.

With reference to FIG. 4, $Vb$ is a voltage value not higher than a cutoff voltage and set to $-4$ V according to the present invention. While the voltage applied to the mesh electrode 6a, no electrons reach the phosphor coating 9, which therefore does not luminesce. Further when the grid pulse voltage of $+1.5$ V is applied as its peak value Va, the phosphor coating 9 luminesces. The grid pulse voltage is applied to the mesh electrode 6a at the time when there is no potential difference between the sine-wave voltages applied to the respective ends of the linear cathode, i.e., at time 0, $T_0$, $2T_0$, $3T_0$, ... shown in FIGS. 4 and 7. This almost completely eliminates the irregularities in luminance due to the potential gradient of the linear cathode 5.

The grid pulse voltage is applied to the mesh electrode 6a as stated above for adjusting the light intensity of the lamp, with its peak value Va altered especially during low-luminance luminescence since the luminescence then involves marked irregularities in luminance due to the potential gradient of the linear cathode 5. Nevertheless, if the peak value Va of the grid pulse voltage is excessively great, the amount of electrons reaching the phosphor coating increases at peaks to heavily burden the circuit and high voltage source. Accordingly, the peak value Va is fixed at luminances not lower than a predetermined level and involving no noticeable irregularities due to the potential gradient. The light intensity can be adjusted perfectly over the range of 0 to 100% by varying the pulse width $\Delta T$ for the adjustment.

Second Embodiment

Figure 5:
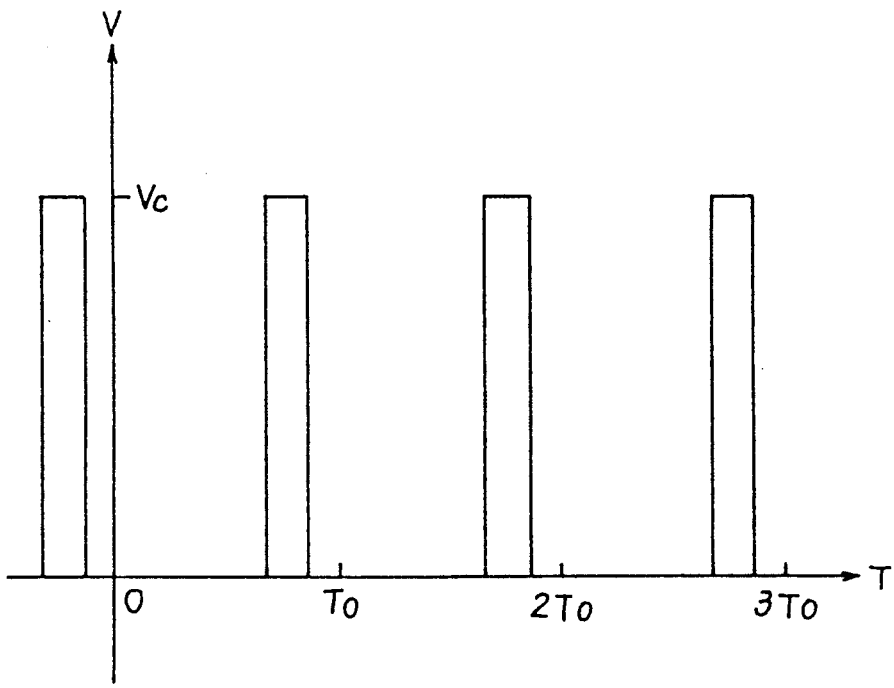
FIG. 5 is a diagram showing the waveform of a pulse voltage which is to be applied to linear cathodes of another embodiment of the invention.

According to this embodiment, the midportion C of each linear cathode 5 of the flat fluorescent lamp shown in FIG. 2 is not grounded, but the one end A thereof is grounded, with a cathode pulse voltage shown in FIG. 5 applied to the other end B.

The peak value Vc of the cathode pulse voltage shown in FIG. 5 is such a voltage value that the cathode 5 can be heated to an extent permitting a thermionic emission, and is +12 V with the present embodiment. When the cathode pulse voltage is +0 V, the grid pulse voltage Va shown in FIG. 4 is applied to the mesh electrode 6a to control the passage of electrons therethrough.

However, application of the cathode pulse voltage Vc, like application of d.c. voltage, creates a potential gradient between the end portions A and B, so that to diminish luminance irregularities, there arises a need to avoid simultaneous application of pulses of the cathode pulse voltage Vc and pulses of the grid pulse voltage Va. According to the present invention, for example, the fall of the cathode pulse voltage Vc is timed with the rise of the grid pulse voltage Vc to avoid the simultaneous application of the pulses.

Although the light intensity adjusting method described can be effectively practiced even when a single mesh electrode is used, two mesh electrodes are employed in the present embodiment, with the grid pulse voltage applied to the mesh electrode 6a closer to the linear cathodes 5 for controlling. It is then possible to provide a gentle potential gradient from the linear cathodes 5 toward the anode 7 and to control the amount of electrons reaching the phosphor coating 9 with greater ease.

The luminance irregularities due to the potential gradient of the linear cathodes, especially those during low-luminance luminescence, can be effectively eliminated by the light intensity adjusting methods of the first and second embodiments described. During low-luminance luminescence, moreover, the peak value of the pulse voltage to be applied to the mesh electrode is varied for adjustment, and when a predetermined luminance is reached, the pulse width of the pulse voltage is altered for adjustment, whereby the intensity of light can be perfectly adjusted efficiently.

Further when a pulse voltage is applied to the linear cathodes for driving, luminescence is effected when there is no potential gradient. This assures suitable adjustment of light intensity to eliminate luminance irregularities.

Third Embodiment

Figure 27:
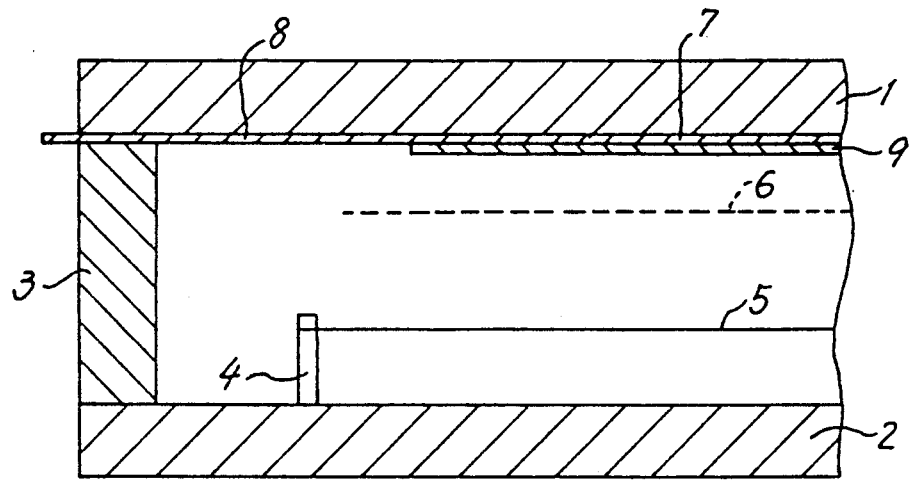
FIG. 27 is a fragmentary view in section of a conventional flat fluorescent lamp.
Figure 28:
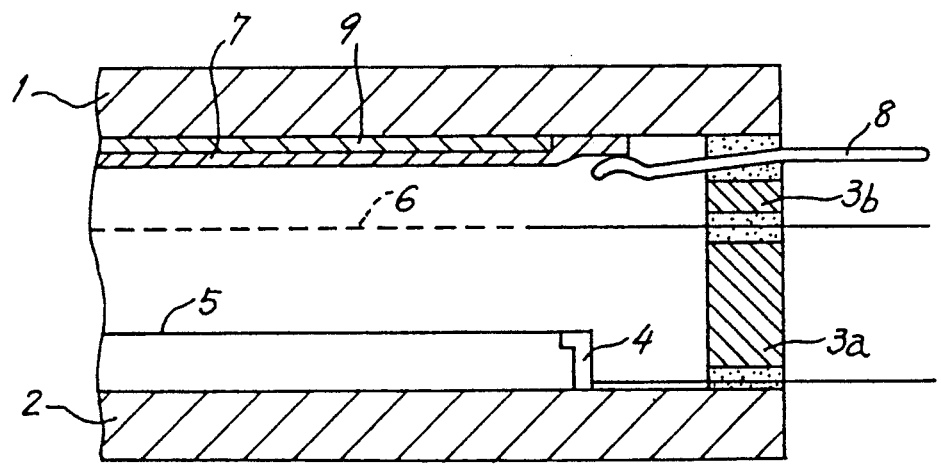
FIG. 28 is a fragmentary view in section of another conventional flat fluorescent lamp.

This embodiment is adapted to overcome the drawbacks of the flat fluorescent lamps shown in FIGS. 27 and 28. The construction of the embodiment will be described with reference to FIGS. 14 to 16.

Figure 14:
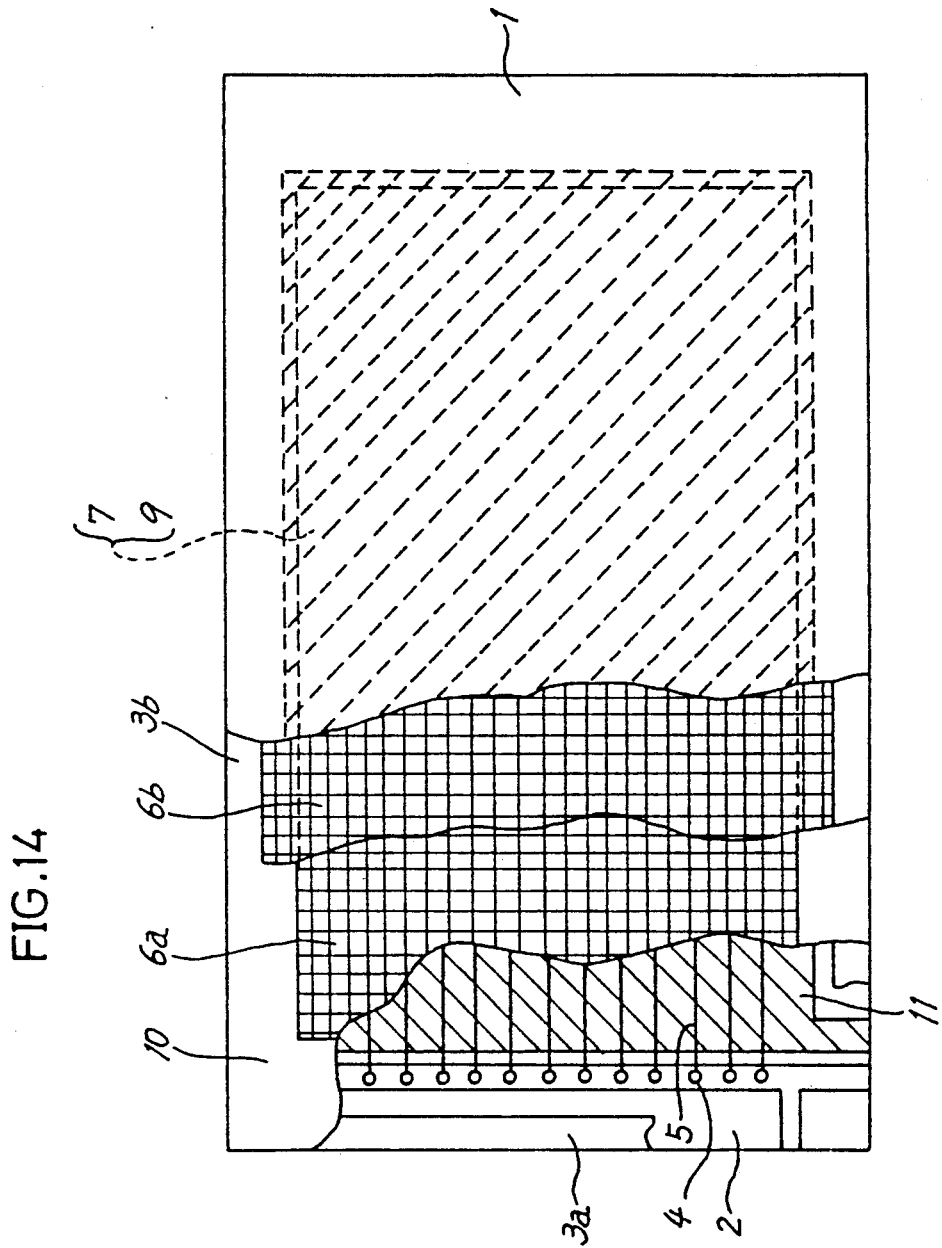
FIG. 14 is a plan view partly broken away of a flat fluorescent lamp embodying the invention and improved in luminescence efficiency.
Figure 15:
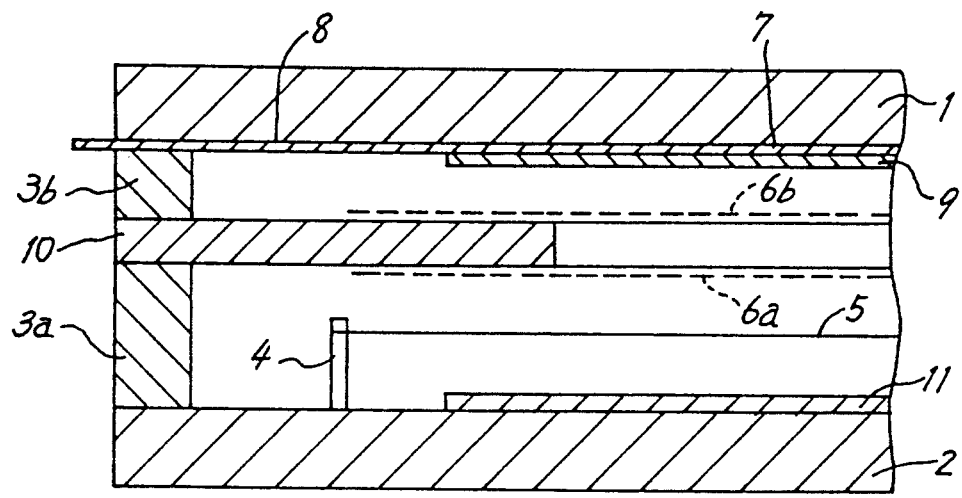
FIG. 15 is a fragmentary view in section of the lamp.

As shown in FIGS. 14 and 15, the third embodiment has the following feature. The glass frame is divided into upper and lower portions 3a and 3b, and a platelike glass spacer 10 of predetermined width is held therebetween. Mesh electrodes 6a and 6b are affixed to the respective opposite surfaces of the spacer.

The glass spacer 19 is interposed between the post 4 and the high voltage supply portion 8, has an opening in the region thereof corresponding to the effective luminescent area of the phosphor coating 9, and prevents discharge between the post 4 and the high voltage supply portion 8 by the frame portion defining the opening.

While the two mesh electrodes are employed, a higher voltage is applied to the mesh electrode 6b adjacent to the anode 7 than the mesh electrode 6a adjacent to the linear cathodes 5. This makes it possible to give a gentle potential gradient from the linear cathodes 5 to the anode 7 and therefore to easily control the amount of electrons to be passed through the mesh electrodes 6a, 6b, hence facilitated adjustment of intensity of light.

A single mesh electrode, when to be used, is affixed to one surface of the glass spacer 10.

The voltages to be applied are 6 $V_{p-p}$ (100 KHz) for the linear cathodes 5, 1 V and 300 V for the mesh electrodes 6a, 6b, respectively, 10 KV for the anode 7, and 16 V for the rear electrode 11.

Figure 16:
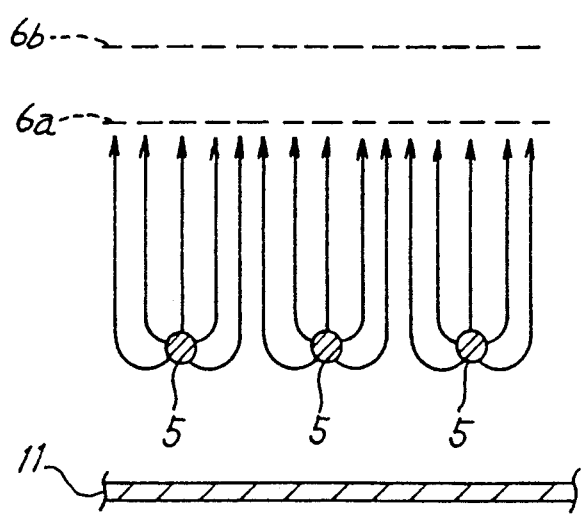
FIG. 16 is a diagram showing how electrons are released from linear cathodes.

The present embodiment is further characterized in that a rear electrode 11 is provided on the inner surface of the rear glass panel 2 for causing each linear cathode 5 to uniformly release electrons. In the absence of the rear electrode 11, electrons will be forced out only from the upper portions of the linear cathodes 5 straight upward toward the mesh electrodes 6a, 6b, with the resulting likelihood that a dark area will be produced between the cathodes 5 adjacent to each other, whereas in the case of the present embodiment, the presence of the rear electrode 11 permits release of electrons also from the lower portions of the cathodes 5 as seen in FIG. 16, giving a uniform flow of electrodes through the mesh electrodes 6a, 6b. These electrons impinge on the phosphor coating 9 also uniformly to give a uniform luminance.

In this case, the linear cathodes 5 can be caused to release a larger amount of electrons on the rear panel side by applying a higher voltage to the rear electrode 11 than to the linear cathodes 5. Further electrons can be attracted toward the front panel 1 by applying a higher voltage to the mesh electrode 6a than to the rear electrode 11. This easily produces an effect to spread out the electron beam as seen in FIG. 16. Desirable voltage values are, for example, 6 V (100 KHz) for the linear cathodes 5, 15 V and 200 v for the mesh electrodes 6a, 6b, respectively, 10 KV for the anode 7, and 10 V for the rear electrode 11.

Fourth Embodiment

Figure 17:
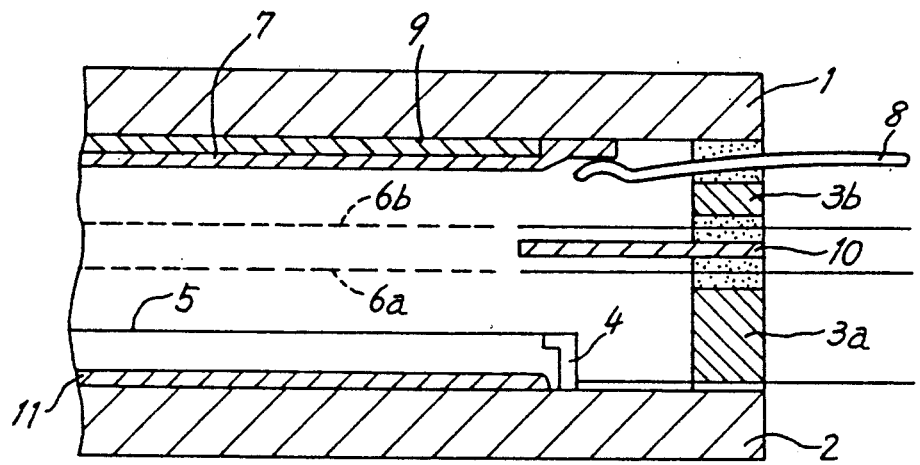
FIG. 17 is a fragmentary view in section of another flat fluorescent lamp embodying the invention.

FIG. 17 shows an embodiment wherein the anode 7 is provided by a metal back in the form of a thin aluminum film.

The flat fluorescent lamp can be improved in luminance by applying a higher voltage to the anode 7, whereas the voltage can be increased only to about 10

KV if highest because of the flat structure. If the lamp is to be made thinner, the maximum value will be lower.

Figure 18:
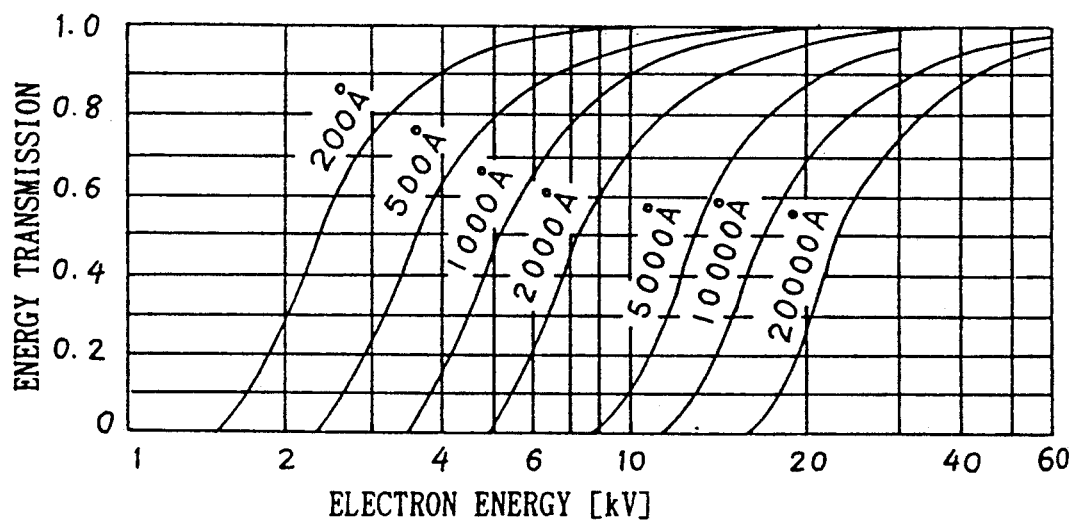
FIG. 18 is a graph showing the transmission characteristics of electron energy through an aluminum film.

Accordingly, to provide the anode 7 by a metal back, the thickness of the aluminum film forming the metal back is made as small as a light value of about 500 to about 600 angstroms which permits the film to function as the anode although the thickness is presently about 800 angstroms. A reduction in the thickness of metal back improves the transmission of energy of electrons therethrough as shown in FIG. 18 to result in an improved luminance. This nevertheless lowers the reflecting function of the metal back 7, permitting a portion of light to leak through the metal back layer 7 to entail a lower luminance.

To overcome the drawback, the rear electrode 11 which was conventionally made of carbon or the like is formed by a light reflecting film such as a thin aluminum film. The rear electrode 11 thin reflects the light leaking through the metal back layer 7, causing the light to advance upward again. When the rear electrode 11 is made of carbon, an aluminum film may be formed on the electrode 11 to give the electrode a light reflecting function.

In the case where the rear electrode 11 has the light reflecting function, it is useful to form the anode 7 between the front glass panel 1 and the phosphor coating 9 shown in FIG. 15 by an electrically conductive transparent film. The light advancing toward the rear glass panel 2 is then reflected from the rear electrode 11 and directed upward. Moreover, the energy loss due to the metal back layer 7 is less to entail a higher efficiency. Additionally, aluminum or the like may be deposited by vacuum evaporation also on the mesh electrodes 6a, 6b on the side thereof facing the front glass panel to give a reflecting function.

Fifth Embodiment

Figure 19:
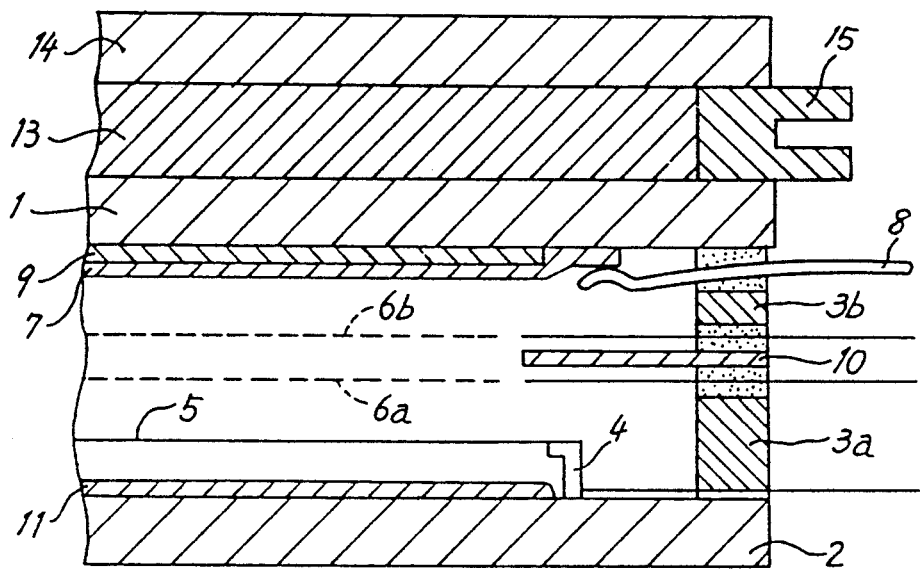
FIG. 19 is a fragmentary view in section of another flat fluorescent lamp embodying the invention.

With reference to FIG. 19, this embodiment is provided with a cooling liquid portion 13 in the vicinity of the front glass panel 1 to prevent the phosphor coating 9 from thermal deterioration.

The energy possessed by electrons is not all converted to light but partly becomes a heat loss to raise the temperature of the front glass panel 1.

According to the present embodiment, therefore, a glass panel 14 is disposed as opposed to the front glass panel 1 and bonded thereto with silicone adhesive or the like to form a liquid-tight container. The container is filled, for example, with an aqueous solution of ethylene glycol as a refrigerant. The cooling liquid portion 13 is further surrounded by a heat release fin 15 made of aluminum or like metal having good heat conductivity for achieving an improved radiation efficiency.

Sixth Embodiment

Figure 20:
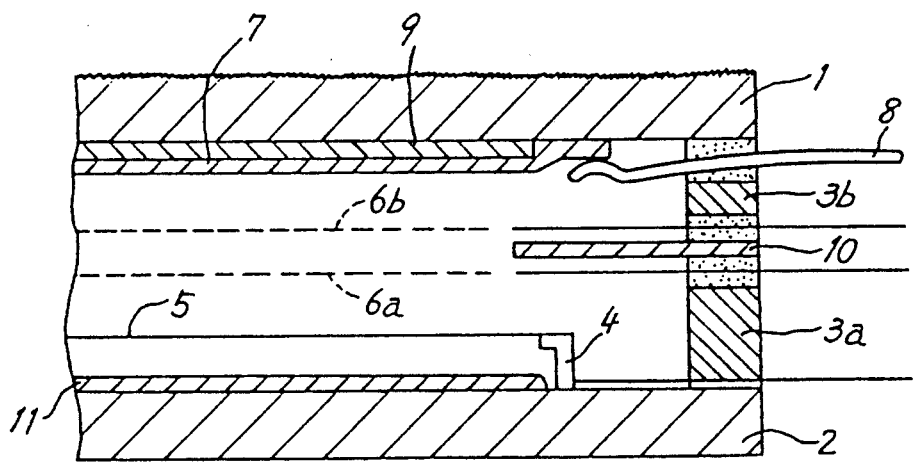
FIG. 20 is a fragmentary view in section of still another flat fluorescent lamp embodying the invention.

Since the electrons from the linear cathodes 5 impinge on the phosphor coating 9 without being deflected, the emergent light also assumes a mesh pattern. Furthermore, coating irregularities on the phosphor coating 9 and minute impurities adhering to the phosphor coating will show up. Accordingly, the front side of the front glass panel 1 is rough-surfaced as shown in FIG. 20, whereby the mesh pattern, coating irregularities, impurities and like irregularities in luminescence can be made less apparent. Despite the rough glass surface, the transmission remains unchanged, resulting in no variations in luminance. The same effect can be achieved by providing a rough-surfaced glass panel 14 on the front glass panel 1. However, since light is scattered in these cases, the present embodiment is not suitable for use as a light source for liquid projectors to be described.

Seventh Embodiment

Figure 21:
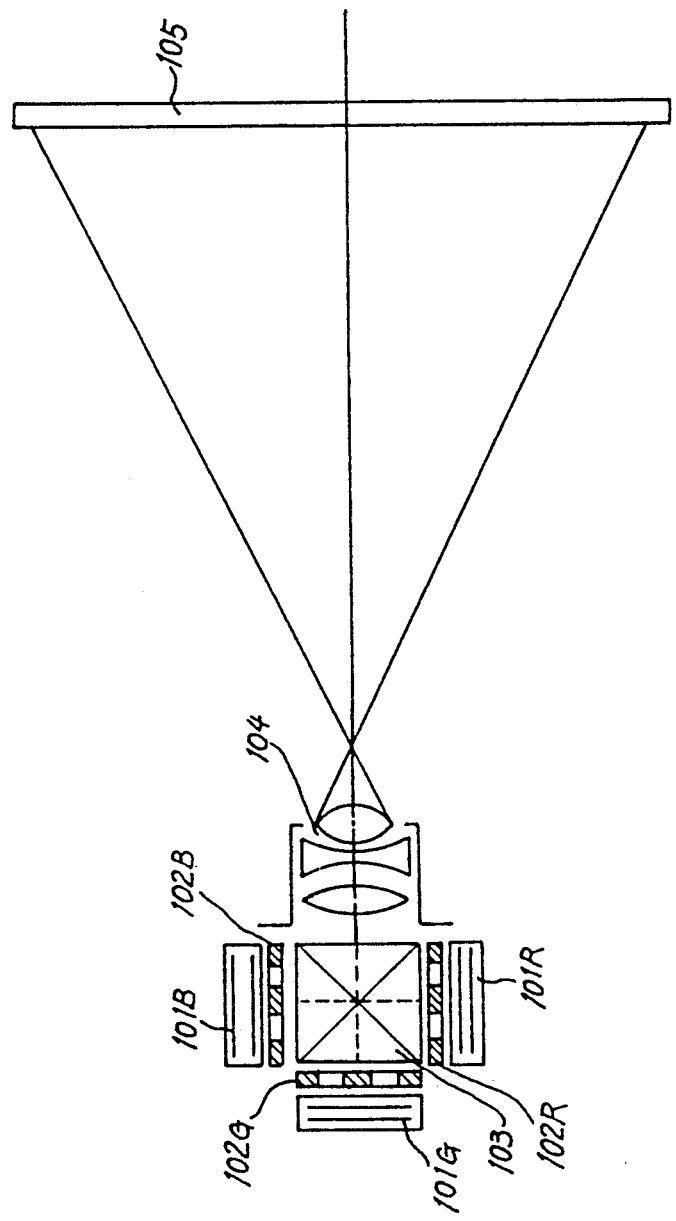
FIG. 21 is a diagram showing a liquid crystal projector embodying the invention.

FIG. 21 shows flat fluorescent lamps embodying the invention and adapted for use in a liquid crystal projector. The phosphor coatings of these flat fluorescent lamps 101R, 101G, 101B are formed by applying red, green and blue monochromatic phosphors, respectively, and are arranged behind R, G and B liquid crystal panels 102R, 102G and 102B, respectively. These liquid crystal panels are arranged close to three sides of a dichroic prism 103, with a projection lens 104 disposed at the other side.

The monochromatic beams from the respective flat fluorescent lamps 101R, 101G, 101B are modulated at the respective liquid crystal panels 102R, 102G, 102B with video signals, then combined by the dichroic prism 103 and projected onto a screen 105 by the lens 104.

Eighth Embodiment

Figure 22:
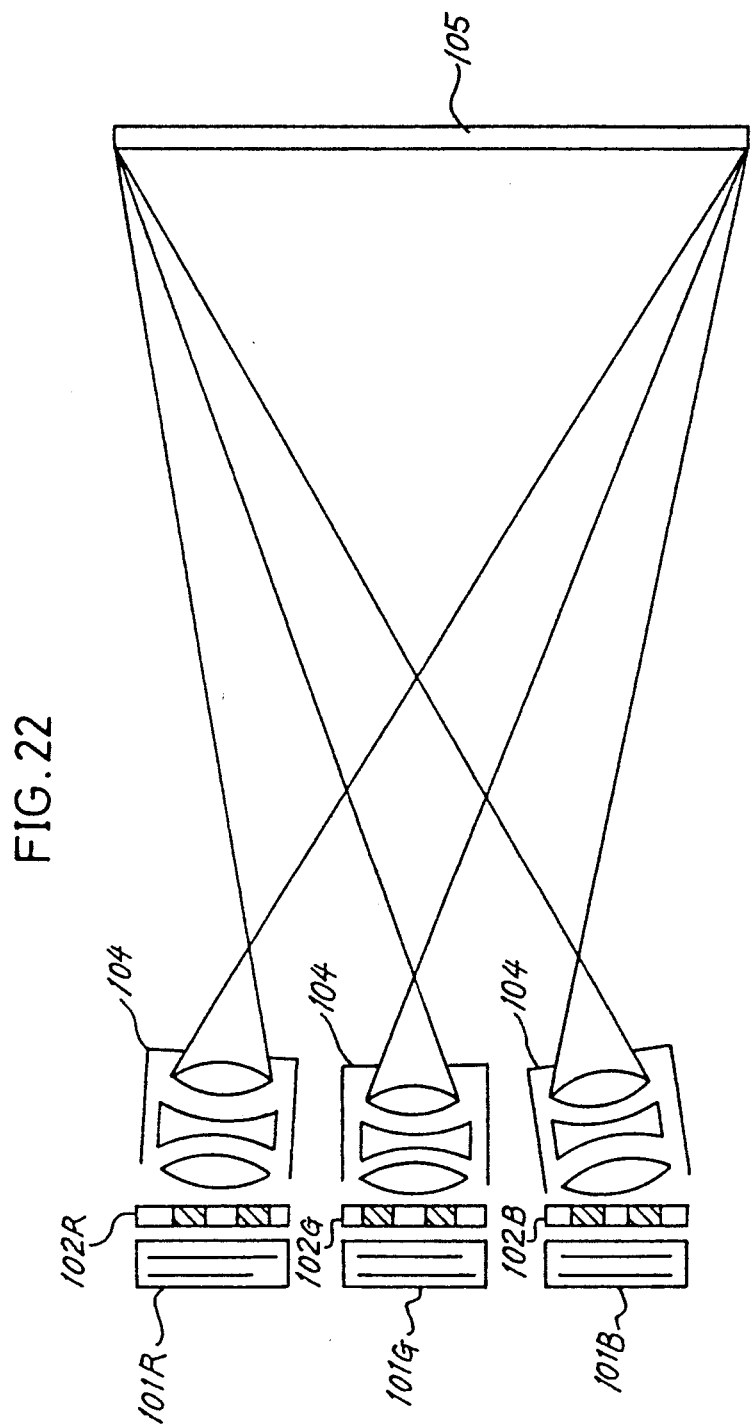
FIG. 22 is a diagram showing another liquid crystal projector embodying the invention.

FIG. 22 shows another embodiment of the invention for use in a liquid crystal projector, wherein no dichroic prism is used. Projection lenses 104, 104, 104 are arranged in front of liquid crystal panels 102R, 102G, 102B, respectively. The beams through the projection lenses are combined on a screen 105.

The use of monochromatic flat fluorescent lamps in liquid crystal projectors as in the seventh and eighth embodiments eliminates the need to separate the light from a conventional metal halide lamp into three primary colors by a plurality of dichroic mirrors, consequently rendering the projector greatly compacted.

Furthermore, the arrangement of the invention assures the light source of a greatly prolonged life in contract with the life of metal halide lamps which is hundreds of hours to 2000 hours.

If flat fluorescent lamps having the cooling liquid portion 13 shown in FIG. 19 are used in liquid crystal projectors, the liquid crystal panels 102R, 102G, 102B which are arranged in contact with the respective cooling liquid portions 13, 13, 13 of the monochromatic flat fluorescent lamps can be cooled at the same time. This serves to further simplify the projector in construction.

Ninth Embodiment

It is desired that the light emanating from the flat fluorescent lamp be entirely in the form of parallel rays, which irradiate the liquid crystal panel and are all propagated through the projection lens, whereas the light emitted by the phosphor coating is actually diffused, so that a limited portion of the light is incident on the projection lens.

Figure 23:
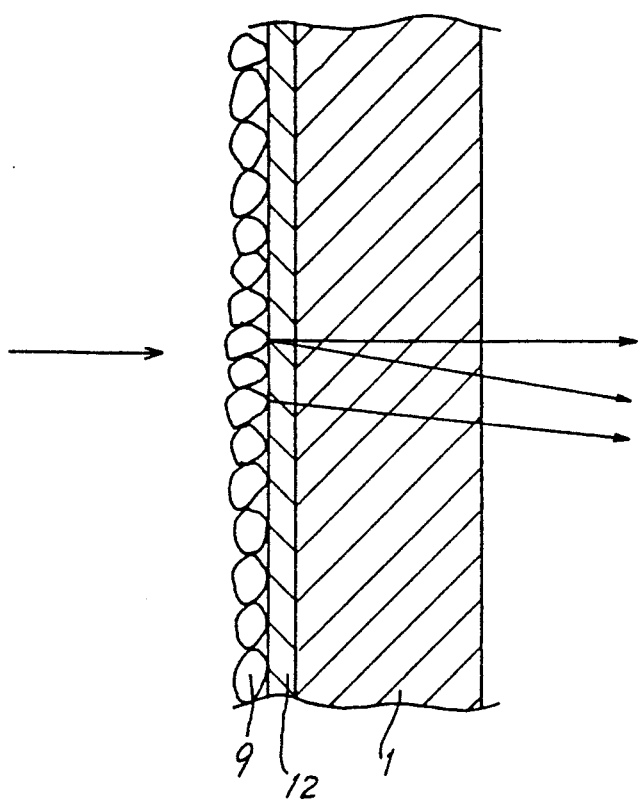
FIG. 23 is a fragmentary view in section showing another flat fluorescent lamp embodying the invention and suitable for use as a light source for liquid crystal projectors.
Figure 24:
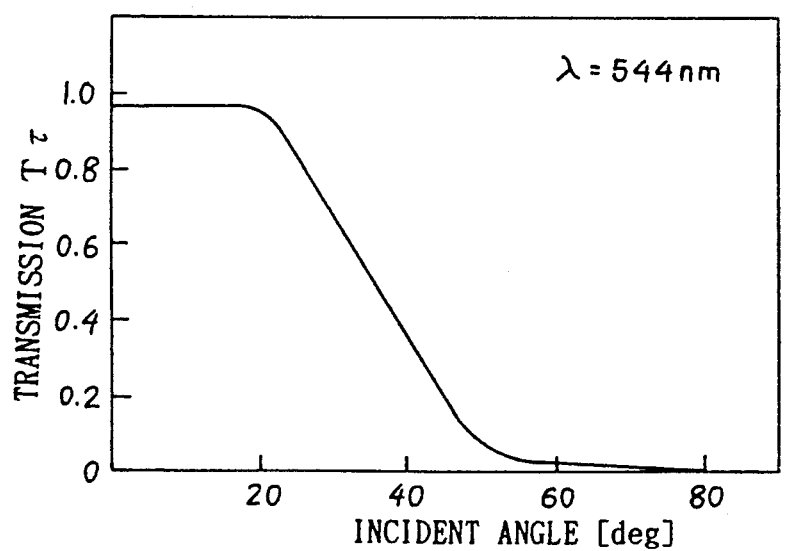
FIG. 24 is a graph showing the transmission characteristics of a multilayer interference film.

An embodiment of flat fluorescent lamp which has overcome this drawback will be described next with reference to FIG. 23. The lamp is characterized in that a multilayer interference film 12 is provided over the entire inner or outer surface of the front glass panel 1. The multilayer interference film 12 comprises thin films of high refractive index and thin films of low refractive index which are arranged alternately in superposed layers. For example, FIG. 24 shows the transmission characteristics of a multilayer interference film 12 at varying angles of incidence of light. The multilayer interference film is formed by alternately depositing $TiO_2$ and $SiO_2$ by vacuum evaporation into a multilayer structure. For example in the case of green light having a wavelength λ of 544 nm, the transmission is set to 0.5 when the incident angle is 32 deg with respect to a normal to the film.

The light emitted from the phosphor coating will be described in the case where the interference film 12 is formed on the inner surface of the front panel 1. Of the emitted light, a light component having a small incident angle with respect to the normal passes through the interference film 12, further passes through the front glass panel 1 and emanates from the lamp forward. A light fraction or component having a large incident angle does not pass through the film 12 but is reflected into the phosphor film and diffused again within the phosphor coating 9. As a result, a portion of the light diffused within the coating makes a small angle with the normal to pass through the film 12, while the remaining light portion is reflected. Repetitions of these phenomena greatly increase the amount of light component having a small angle with the normal, with the result that the amount of light incident on the projection lens increases 1.6 to 1.7 times.

Multilayer interference films having specified characteristics are also prepared for the red and blue flat fluorescent lamps, whereby the same effect as above can be obtained.

Tenth Embodiment

Figure 25A:
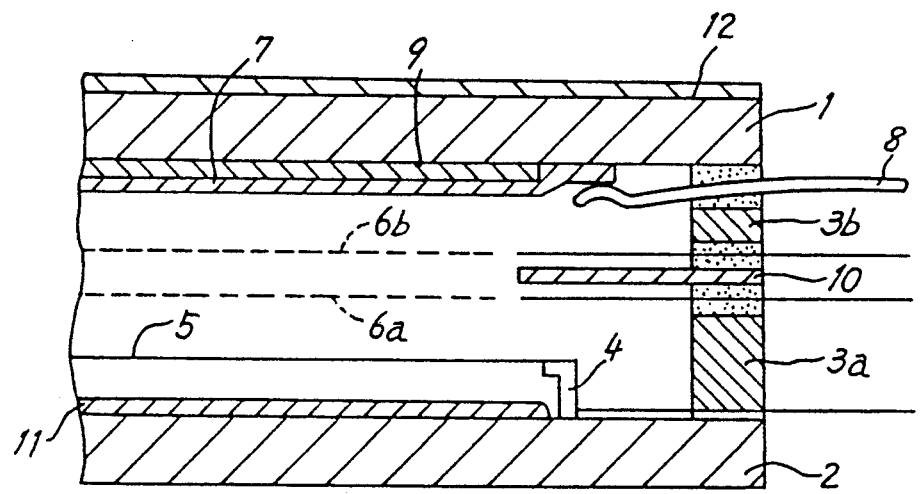
FIG. 25A is a fragmentary view in section showing a flat fluorescent lamp having the multilayer interference film on the outer surface of a front glass plate.

It is likely that the multilayer interference film 12 will deteriorate owing to irradiation with electrons. FIG. 25A shows a flat fluorescent lamp wherein the multilayer interference film 12 is formed on the outer surface of the front glass panel 1 and is thereby prevented from deterioration.

Figure 25B:
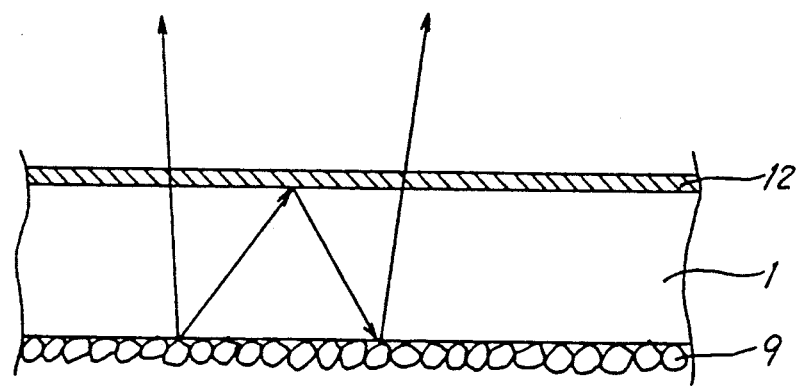
FIG. 25B is an enlarged view in section showing reflection of light within the lamp.

With this flat fluorescent lamp, the light emitted by the phosphor coating 9 is reflected at the interference film 12, passes through the front glass panel 1 a plurality of times as shown in FIG. 25B and is therefore attenuated during this travel. The present embodiment accordingly results in a lower intensity of light than the embodiment of FIG. 23, but the interference film 12 is prevented from deterioration, permitting the lamp to have a longer life.

Eleventh Embodiment

Figure 26A:
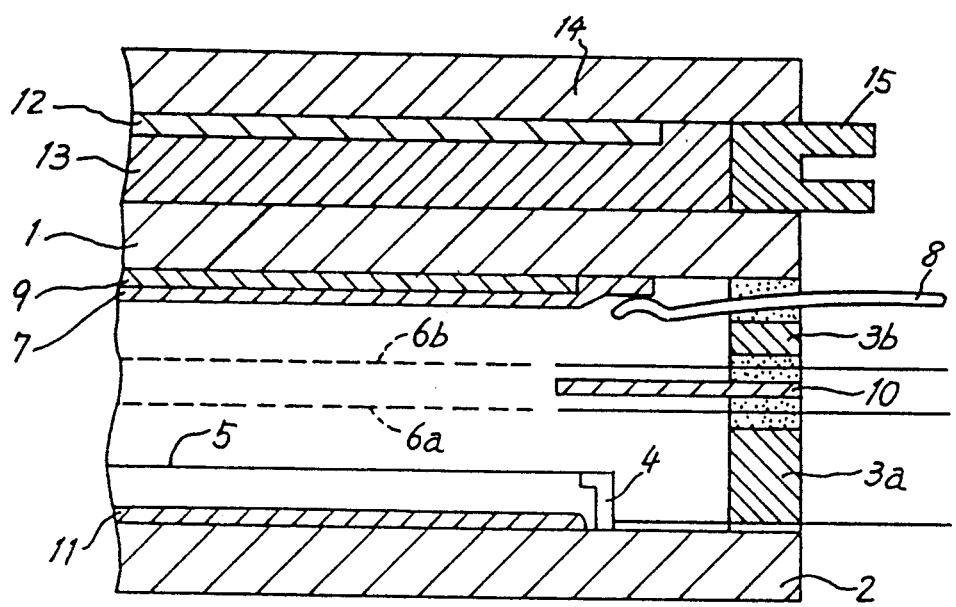
FIG. 26A is a fragmentary view in section of a flat fluorescent lamp wherein the multilayer interference film is formed between a glass panel and a cooling liquid portion.

The fluorescent lamp shown in FIG. 19 and having the cooling liquid portion 13 may be provided with a multilayer interference film 12 formed on the inner surface of the glass panel 14 facing the liquid portion 13 as seen in FIG. 26A.

Figure 26B:
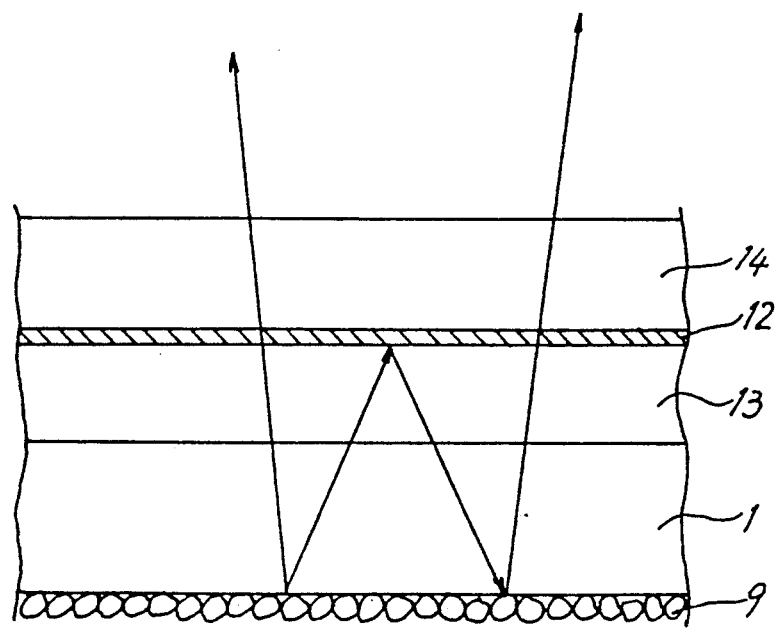
FIG. 26B is an enlarged view in section showing reflection of light within the lamp.

With this lamp, the light emitted by the phosphor coating 9 is reflected at the interference film 12 as shown in FIG. 26B and passes through the front glass panel 1 and the liquid portion 13 a plurality of times. As a result, the intensity of light decreases by several percent as in the above embodiment, but the lamp can be given a prolonged life. If the interference film 12 does not deteriorate, the film 12 is reusable when removed in the case where the lamp becomes unusable owing to a malfunction of some other part.

The foregoing embodiments have been given to illustrate the present invention and should not be interpreted as restricting the invention as defined by the appended claims or reducing the scope thereof. The construction of the lamp of the invention is not limited to those of the embodiments but can be modified variously by one skilled in the art without departing from the scope of the invention defined in the claims.

What is claimed is:

1. A method of adjusting the intensity of light of a flat fluorescent lamp comprising:
    a flat glass container formed by a front glass panel, a rear glass panel and glass frames,
    a phosphor coating formed along the inner surface of the front glass panel,
    an anode disposed adjacent to the phosphor coating,
    a plurality of linear cathodes arranged in parallel to the anode and supported by support members, and
    at least one mesh electrode disposed between the anode and the linear cathodes,
    the method comprising applying a pulse voltage to the mesh electrode to adjust the amount of electrons reaching the phosphor coating, wherein one end of each of said plurality of linear cathodes is grounded, with a pulse voltage applied to the other end thereof, and wherein the pulse voltage to be applied to the mesh electrode is applied thereto in synchronism with a time when the opposite ends of each linear cathode are at equal potentials.

2. A method as defined in claim 1 wherein each of the linear cathodes is grounded at its midportion, and sine-wave voltages reverse to each other in phase are applied to respective opposite ends of the linear cathode.

3. A method as defined in claim 2 wherein the pulse voltage is applied to the mesh electrode in synchronism with the time when said opposite ends of each linear cathode are at equal potentials.

4. A method as defined in claim 1 wherein the amount of electrons reaching the phosphor coating is controlled by altering the pulse width of the pulse voltage to be applied to the mesh electrode.

5. A method as defined in claim 1 wherein the amount of electrons reaching the phosphor coating is controlled by altering the peak value of the pulse voltage to be applied to the mesh electrode.

* * * * *